(No Model.) 2 Sheets—Sheet 2.
A. WEBBER.
MIXING APPARATUS FOR CAKE, &c.
No. 590,782. Patented Sept. 28, 1897.
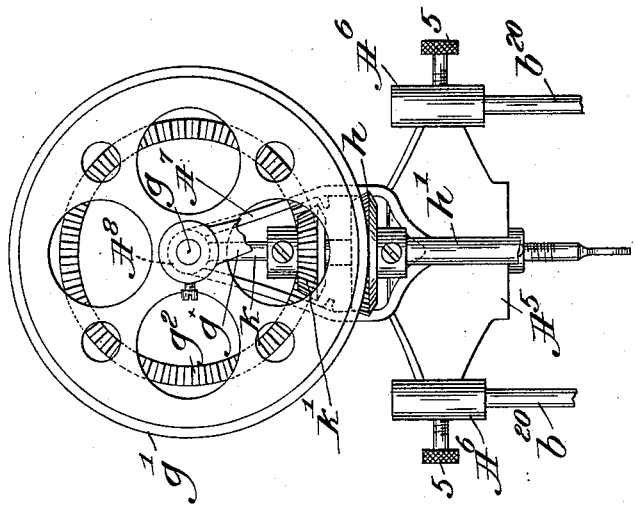
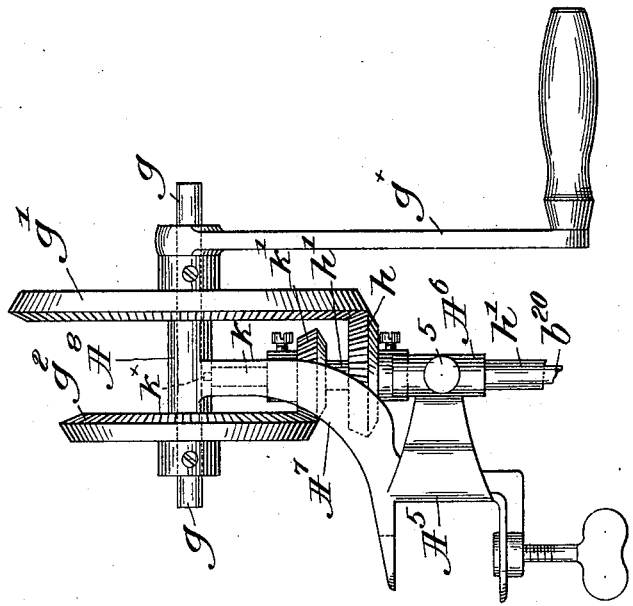
Witnesses.
Fred S. Greenleaf
Thomas J. Drummond
Inventor.
Alexander Webber.
By Crosby & Gregory,
Attys

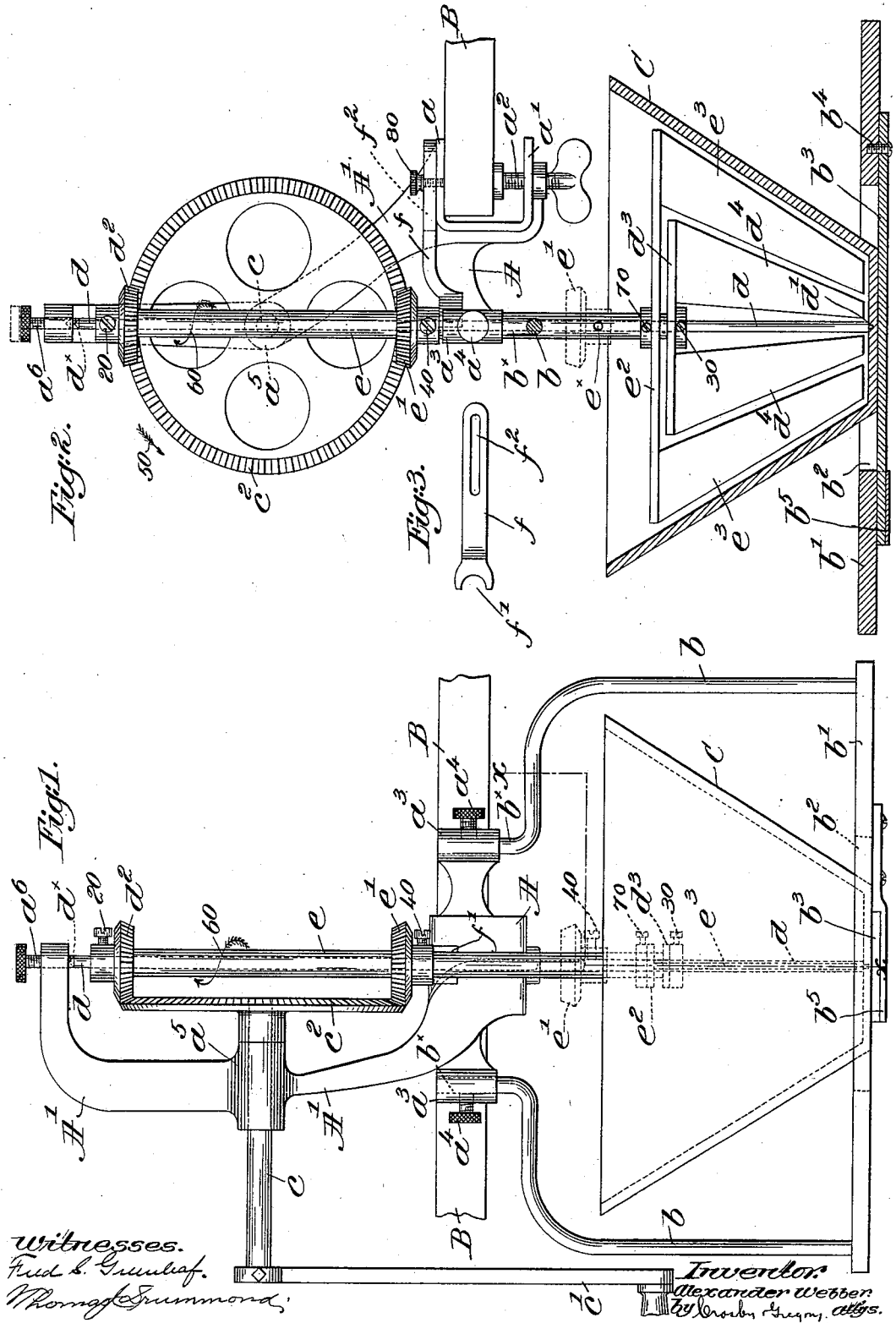

UNITED STATES PATENT OFFICE.

ALEXANDER WEBBER, OF WINTHROP, MASSACHUSETTS.

MIXING APPARATUS FOR CAKE, &c.

SPECIFICATION forming part of Letters Patent No. 590,782, dated September 28, 1897.

Application filed September 16, 1895. Serial No. 562,635. (No model.)

*To all whom it may concern:*

Be it known that I, ALEXANDER WEBBER, of Winthrop, county of Suffolk, State of Massachusetts, have invented an Improvement in Mixing Apparatus for Cake, &c., of which the following description, in connection with the accompanying drawings, is a specification, like letters and figures on the drawings representing like parts.
This invention has for its object the production of a simple, efficient, and readily-operated apparatus for mixing cake or other batter, beating up eggs, and for other similar culinary uses. For such purposes it is most desirable that the apparatus can be readily removed from the vessel in which the stirring is conducted in order that the stirrer may be easily cleaned. Should the stirrer be substantially a fixture as regards the mixing vessel, it will be obvious that the mixed materials would have to be removed therefrom into another vessel for use and the difficulty of cleaning the apparatus would be very greatly increased.
In my invention I have provided means whereby the mixing vessel and its contents can be quickly and bodily withdrawn from the mixing or stirring device, and the stirrer itself is instantly detachable from the actuating mechanism for cleansing purposes.

My invention accordingly consists in a mixing or stirring apparatus constructed substantially as will be hereinafter described in the specification and particularly pointed out in the claims.

Figure 1 is a front view of a mixing or stirring apparatus embodying my invention with the parts in position ready for use. Fig. 2 is a partial side elevation thereof and partly in section on the irregular line $xx$, Fig. 1. Fig. 3 is a detached plan view of the stirrer-retaining device to be described. Fig. 4 is a side elevation of a modified form of actuating mechanism for the stirrer, and Fig. 5 is a front view thereof.

I have shown in Figs. 1 and 2 the apparatus as mounted on and supported by a bracket A, having jaws $a$ $a'$ to receive between them the edge of a table or other suitable support B, a clamping-screw $a^2$, rigidly securing the bracket thereto, as clearly shown in Fig. 2. The bracket is laterally extended in front and provided with upright hubs $a^3$, adapted to receive the ends $b^\times$ of a stirrup $b$, retained in said hubs by set-screws $a^4$, the stirrup having a flat base $b'$, in which is cut an opening $b^2$ larger than the bottom of the mixing vessel or bowl C. (Shown in place in Figs. 1 and 2.)

Upon the under side of the base $b'$ a plate $b^3$ is pivoted at $b^4$ to swing clear of the opening $b^2$ when desired, a suitable cleat $b^5$ on the opposite side of the opening retaining the plate $b^3$ in operative position across the said opening, the mixing vessel resting on said plate when in use. An arm $A'$, extended upwardly from and forming a part of the bracket A, has a hub $a^5$, which provides a bearing for a horizontal shaft $c$, to the outer end of which a crank-handle $c'$ is attached, by which the shaft can be rotated, while at its other end and inside of the arm $A'$ is secured a large bevel-gear $c^2$, which actuates the stirrer.

The stirrer mechanism consists of a rod or shaft $d$, preferably shaped at its lower end, as at $d'$, to enter a depression or bearing therefor in the bottom of the vessel C, while the upper end of the shaft is preferably pointed, as at $d^\times$, Figs. 1 and 2, to enter the concave end of the bearing-screw $a^6$, adjustable in the top of the bracket-arm $A'$, the said screw being vertically above the bearing in the bottom of the mixing vessel when the latter is in operative position.

The hub of a small bevel-gear $d^2$ is held fast by a set-screw 20 on the upper end of the shaft $d$, with its teeth in mesh with the large actuating-gear $c^2$ to be rotated thereby, a cross-head $d^3$, secured to the lower end of the shaft $d$ by a set-screw 30, having two depending blades $d^4$ (see Fig. 2) diametrically opposite each other and with their free lower ends just above the bottom of the vessel C. A long sleeve $e$ surrounds the rod $d$ between the gear $d^2$ and the cross-head $d^3$ and is prevented by said parts from longitudinal movement on the rod $d$ while freely rotatable thereon, said sleeve having secured thereto by a set-screw 40 a small bevel-gear $e'$ in mesh with the actuating-gear $c^2$, the gears $d^2$ and $e'$ being so located relative to the actuating-gear $c^2$ that they will be rotated in opposite directions. If the gear $c^2$ be rotated in the direction of arrow 50, Fig. 2, the sleeve $e$ will be rotated in the direction of arrow 60, Figs. 1 and 2, and the rod $d$ in the opposite direction. A cross-head $e^2$ is secured by a set-screw 70 in its hub to the lower end of the sleeve, said cross-head having attached thereto depending blades $e^3$, opposite each other and adapted to travel around the blades $d^4$ and in the opposite direction, each set of blades being narrowed toward their lower ends to conform to the shape of the vessel C, and it will be obvious that when the actuating-gear $c^2$ is turned the two sets of stirrer-blades $d^4$ $e^3$ will be rotated rapidly in opposite directions to thoroughly mix or stir together the contents of the bowl C. As the lower ends of the blades just clear the bottom of the bowl, the smallest quantity of batter can be mixed as readily as if the bowl were nearly or entirely filled, and if the apparatus is employed for beating eggs one or more can be beaten with equal facility.

To use the apparatus, the plate $b^3$ is swung to one side and the bowl or vessel C placed in the stirrup, the opening $b^2$ permitting it to drop considerably lower than as shown in Figs. 1 and 2, and then the end $d'$ of the shaft or rod $d$ is fitted into its bearing. The bowl is then raised until the plate $b^3$ can be swung beneath and to support it, and at the same time the bearing-screw $a^6$ is lowered from dotted-line position, Fig. 2, until the pointed end $d^\times$ of the rod $d$ enters its concavity, when the apparatus is ready for use.

In order to sustain the stirrer mechanism against undue vibration, I have provided an arm $f$, (shown separately in Fig. 3,) having a substantially semicircular bearing $f'$ in its outer end and longitudinally slotted at $f^2$, the notched portion $f'$ being adapted to surround the sleeve $e$ below the hub of the gear $e'$, as shown in Figs. 1 and 2, a set-screw 80, extended through the slot $f^2$ into the bracket A, maintaining the arm in place. The arm also serves to keep the stirring mechanism from falling when the bowl C is lowered or removed, while it offers no resistance to removal of said mechanism laterally for the purpose of cleaning it.

When the contents of the vessel have been beaten or stirred sufficiently, the plate $b^3$ is swung to one side, and the bowl can then be tipped sufficiently to withdraw it from the stirrer, or the latter can be removed bodily after the bowl has been lowered to disengage it from the end $d'$ of the rod $d$.

The rotation of the two sets of blades in opposite directions acts with greater rapidity and thoroughness upon the material to be beaten or stirred, and in most instances is preferable. Should it be desirable, however, to rotate all of the blades in the same direction, the set-screw 40 may be loosened to lower the gear $e'$ into dotted-line position, Figs. 1 and 2, out of engagement with the actuating-gear $c^2$, and by means of a hole $e^\times$ in the sleeve $e$ the set-screw 40 can be extended therein to bear against the rod $d$, so that the sleeve and rod will be rotated together.

In Figs. 4 and 5 I have shown a modified form of actuating mechanism for the stirrer wherein the bracket $A^5$ has two hubs $A^6$ to receive the stirrup ends $b^{20}$, held in place by set-screws 5, while an upturned portion $A^7$ of the bracket has a sleeve-bearing $A^8$ for an actuating-shaft $g$, to which are secured bevel-gears $g'$ and $g^2$, the gear $g'$ being shown as the larger and in mesh with a bevel-gear $h$ on a sleeve $h'$. Said sleeve or hollow shaft $h'$ surrounds loosely a shaft $k$, having at its upper end a bevel-gear $k'$ in mesh with the gear $g^2$, the said gear resting on the top of the sleeve $h'$, the lower ends of the sleeve and shaft having attached thereto sets of blades (not shown) similar to those illustrated in Figs. 1 and 2.

The top of the shaft $k$ is reduced at $k^\times$ (see dotted lines, Fig. 4) to enter a bearing in the sleeve $A^8$, and a crank-handle $g^\times$ is secured to the shaft $g$ to rotate it, and as the gears $g'$ and $g^2$ engage the gears $h$ and $k'$ on opposite sides the latter will be rotated in opposite directions to impart opposite rotation to the stirrer-blades.

My invention is not restricted to the precise construction and arrangement shown, as it is obvious that the same may be varied or rearranged without departing from the spirit and scope of my invention.

It will be obvious that the stirring mechanism can be removed from the bowl or vessel by raising the bearing-screw $a^6$ out of engagement with the upper end of the shaft $d$ without moving the bowl or vessel, so that the stirring mechanism can be bodily detached in either manner and removed.

I claim—

1. In an apparatus of the class described, a supporting-bracket, a stirrup attached thereto having an opening in its bottom, a closure for said opening, a bearing on said bracket, a vessel to rest on the stirrup, and a bearing therein, detachable stirring mechanism adapted to be supported in said bearings, and means mounted on the bracket to rotate the stirring mechanism, substantially as described.

2. In an apparatus of the class described, a bracket, an actuating-shaft therein, a depending support to sustain the vessel to receive the material, stirring mechanism, bodily removable from the bracket and vessel, including blades adapted to be oppositely rotated in said vessel, supporting-bearings for the said mechanism when in use, and an auxiliary bearing adapted to sustain the said mechanism upon removal of the vessel, and connections between the actuating-shaft and stirring mechanism, substantially as described.

3. In an apparatus of the class described, a bodily-removable stirring mechanism comprising a shaft, a surrounding sleeve, a gear and a stirrer-blade secured to each, and an adjustable connection between the sleeve and its gear, combined with an independent actuating-shaft, gearing connecting it and the sleeve and shaft-gears, to rotate the stirrer-blades, means to govern the direction of rotation of the stirrer-blades relatively each to the other, and to insure rotation in the same or opposite directions, and bearings for the shaft of the stirring mechanism, substantially as described.

4. In an apparatus of the class described, a bracket having an adjustable bearing and an auxiliary supporting-bearing, a vessel to receive the material and having a bearing in the bottom thereof, and actuating mechanism carried by the bracket, combined with bodily-removable stirring mechanism, comprising a plurality of stirrer-blades, and a shaft and a surrounding sleeve, to which the blades are attached, the shaft being supported between the adjustable bearing and the bearing in the vessel when in use and adapted to be supported between the adjustable bearing and the auxiliary bearing upon removal of the vessel, substantially as described.

In testimony whereof I have signed my name to this specification in the presence of two subscribing witnesses.

ALEXANDER WEBBER.

Witnesses:
   JOHN C. EDWARDS,
   LAURA S. MANIX.